(12) United States Patent
Nozaki et al.

(10) Patent No.: US 6,956,002 B2
(45) Date of Patent: Oct. 18, 2005

(54) PROCESS FOR POLYMERIZATION OF OLEFINS

(75) Inventors: Takashi Nozaki, Mabi (JP); Akio Fujiwara, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/492,907

(22) PCT Filed: Oct. 15, 2002

(86) PCT No.: PCT/JP02/10677

§ 371 (c)(1),
(2), (4) Date: Apr. 16, 2004

(87) PCT Pub. No.: WO03/035704

PCT Pub. Date: May 1, 2003

(65) Prior Publication Data

US 2004/0254314 A1 Dec. 16, 2004

(30) Foreign Application Priority Data

Oct. 19, 2001 (JP) .............................. 2001-322620
Dec. 10, 2001 (JP) .............................. 2001-375541

(51) Int. Cl.$^7$ .......................... C08F 4/622; C08F 4/642
(52) U.S. Cl. .............. 502/115; 502/128; 502/154; 526/124.7; 526/124.8; 526/132; 526/133; 526/134; 526/160; 526/943
(58) Field of Search ................. 526/128, 129, 526/133, 160, 124.7, 124.8, 134, 943, 132; 502/115, 154, 128

(56) References Cited

U.S. PATENT DOCUMENTS 5,241,025 A * 8/1993 Hlatky et al. ............ 526/129
6,211,311 B1 * 4/2001 Wang et al. ............. 526/131

FOREIGN PATENT DOCUMENTS

| JP | 1-501950 A | 7/1989 |
| JP | 1-502036 A | 7/1989 |
| JP | 3-179005 A | 8/1991 |
| JP | 3-207704 A | 9/1991 |
| JP | 4-12283 B2 | 3/1992 |
| JP | 5-505838 A | 8/1993 |
| JP | 5-301917 A | 11/1993 |
| JP | 6-136047 A | 5/1994 |
| JP | 9-59310 A | 3/1997 |
| JP | 10-298222 A | 11/1998 |
| JP | 11-199618 A1 | 7/1999 |
| JP | 11-269222 A | 10/1999 |
| WO | WO 91/14713 A1 | 10/1991 |
| WO | WO 99/67302 A1 | 12/1999 |
| WO | WO 00/50469 A1 | 8/2000 |

OTHER PUBLICATIONS

Taube et al., Journal of Organometallic Chemistry, vol. 347, pp. C9–C11 (1988).
Jordan et al., J. Am Chem. Soc., vol. 109, pp. 4111–4113 (1987).
Bochmann et al., Journal of Organometallic Chemistry, vol. 497, pp. 55–59 (1995).

* cited by examiner

*Primary Examiner*—Caixia Lu
(74) *Attorney, Agent, or Firm*—Birch, Stewart, Kolasch & Birch, LLP

(57) ABSTRACT

A catalyst for olefin polymerization, comprising:
   a solid catalyst component comprising
   [A] a solid component having substantially no hydroxyl group,
   [B] a compound of a transition metal selected from Groups 3–11 of the Periodic Table, and
   [C] a mixture of an activator compound (C-1) capable of reacting with the transition metal compound [B] to form a metal complex having catalytic activity and an organoaluminum compound (C-2); and
   [D] an organomagnesium compound soluble in a hydrocarbon solvent which is obtained by reacting (i) an organomagnesium compound represented by the general formula:

$$(Mt)_\alpha (Mg)_\beta (R^1)_a (R^2)_b$$

wherein Mt is a metal atom belonging to Groups 1–3 of the Periodic Table, $R^1$ and $R^2$ are hydrocarbon groups of 2–20 carbon atoms, and $\alpha$, $\beta$, a and b are numerals satisfying the following relationship: $0 \leq \alpha$, $0 < \beta$, $0 \leq a$, $0 < b$, $a+b > 0$, and $r\alpha + 2\beta = a+b$ (where r is a valence of Mt) with (ii) a compound selected from an amine, an alcohol and a siloxane.

7 Claims, No Drawings

PROCESS FOR POLYMERIZATION OF OLEFINS

TECHNICAL FIELD

The present invention relates to a catalyst for olefin polymerization and a method for polymerizing olefins using said catalyst.

BACKGROUND ART

Hitherto, so-called Ziegler-Natta catalysts comprising a titanium compound and an organoaluminum compound have been known as catalysts for producing polymers or copolymers of olefins. On the other hand, recently, a technology has been found wherein homopolymerization of ethylene or copolymerization of ethylene with other α-olefins can be performed with high activity by using catalysts comprising a so-called metallocene compound such as bis(cyclopentadienyl)zirconium dichloride and an aluminoxane which is a kind of organoaluminumoxy compounds. The details of this technology are disclosed in JP-B-4-12283 (corresponding to DE 3127133.2).

On the other hand, as catalyst systems using activators other than the organoaluminumoxy compounds, Taube et al. report in J. Organometall. Chem., 347. C9(1988) carrying out polymerization of ethylene using a compound represented by $[Cp_2TiMe(THF)]^+[BPh_4]^-$ (Cp: cyclopentadienyl group, Me: methyl group, Ph: phenyl group, THF: tetrahydrofuran). Jordan et al. report in J. Am. Chem. Soc., 109. 4111(1987) that ethylene is polymerized using a zirconium complex represented by $[Cp_2ZrR(L)]^+$ (R: methyl group or benzyl group, L: Lewis base).

Furthermore, JP-A-1-501950 and JP-A-1-502036 disclose a method for polymerizing olefins using a catalyst comprising a cyclopentadienyl metal compound and an ionic compound capable of stabilizing a cyclopentadienyl metal cation.

In addition, JP-A-5-301917, JP-A-6-136047, JP-A-9-59310, JP-A-11-269222, etc. disclose catalyst systems using organoaluminum compounds and clays, clay minerals or ion-exchangeable laminar compounds as activators.

In general, when olefins are polymerized by using these metallocene catalysts, alkylaluminums such as triethylaluminum and triisobutylaluminum ordinarily used in Ziegler-Natta catalysts are used together with the metallocene catalysts. The alkylaluminums are the materials that serve to remove impurities in the polymerization system which become catalyst poisons, i.e. scavengers, and are added to the polymerization system in order to maintain high activity.

As methods for polymerization of olefins using the metallocene catalyst and the alkylaluminum, JP-A-3-179005 discloses polymerization of olefins in the presence of a catalyst comprising a neutral metallocene compound, an alkylaluminum and a Lewis acid, JP-A-3-207704 discloses a method of polymerization of olefins which includes mixing a metallocene catalyst prepared from a neutral metallocene compound and an ionic compound with an aluminumalkyl-olefin mixture, and JP-A-5-505838 discloses polymerization of olefins in the presence of a catalyst containing the reaction product of a group IV metal compound of bis(cyclopentadienyl) having a proton reactive substituent with a compound of a cation having a donatable proton and an activator, and a compound of a Group IIIA element.

However, as disclosed in Journal of Organometallic Chemistry 497 (1995) 55–59, in the presence of an excess amount of trimethylaluminum or triethylaluminum, the catalysts are poisoned and thus have lower polymerization activity. Therefore, there is a problem that the scavengers for displaying the activity in metallocene catalysts can be effectively used only when their concentration is in a specific narrow range and thus it is difficult to maintain the polymerization activity at a high level.

As a result of intensive research conducted by the present inventors, it has been found that when specific organomagnesium compounds are used as the scavenger, the reduction in the polymerizing activity of the catalyst does not occur regardless of the scavenger concentration, thus the high polymerizing activity of the catalyst can be maintained in a wide range of the scavenger concentration. Thus, the present invention has been accomplished.

The object of the present invention is to provide a catalyst for olefin polymerization comprising a scavenger which can maintain a high polymerization activity of the catalyst in a wide range of scavenger concentration and a method for polymerization of olefins using said catalyst, that can provide a polymer powder which does not cause any phenomena, such as deposition on the reactor during the polymerization, and has excellent particle properties.

DISCLOSURE OF INVENTION

Under the circumstances, the present inventors have conducted intensive research in an attempt to find a catalyst for olefin polymerization which contains a scavenger which can maintain a high polymerization activity of the catalyst in a wide range of scavenger concentration and that provides a polymer powder causing no phenomena such as deposition on the reactor during polymerization and having excellent particle properties. As a result, they have accomplished the present invention.

That is, the present invention includes the following embodiments.

1) A catalyst for olefin polymerization, comprising:

a solid catalyst component comprising:

[A] a solid component having substantially no hydroxyl group,

[B] a compound of a transition metal selected from metals of Groups 3–11 of the Periodic Table, and

[C] a mixture of an activator compound (C-1) capable of reacting with the transition metal compound [B] to form a metal complex having catalytic activity and an organoaluminum compound (C-2); and

[D] an organomagnesium compound soluble in a hydrocarbon solvent which is obtained by reacting (i) an organomagnesium compound represented by the general formula:

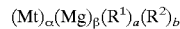

wherein Mt is a metal atom belonging to Groups 1–3 of the Periodic Table, $R^1$ and $R^2$ are hydrocarbon groups of 2–20 carbon atoms, and α, β, a and b are numerals satisfying the following relationship $0 \leq \alpha$, $0 < \beta$, $0 \leq a$, $0 \leq b$, $a+b>0$, and $r\alpha + 2\beta = a+b$ (where r is a valence of Mt) with (ii) a compound selected from amine, alcohol and siloxane compounds.

2) A catalyst for olefin polymerization according to the above 1), wherein Mt is Al, B, Zn or Be 3) A catalyst for olefin polymerization according to the above 1) or 2), wherein α and β satisfy the relationship $\alpha > 0$ and $0.5 \leq \beta/\alpha < 10$.

4) A catalyst for olefin polymerization according to any of the above 1) to 3), wherein $R^1$ is a primary alkyl group.

5) A catalyst for olefin polymerization according to any of the above 1) to 4), wherein the compound [B] of a transition metal selected from metals of Groups 3–11 of the Periodic Table is a compound represented by the following formula (1):

$$L_j W_k M X_p X'_q \qquad (1)$$

wherein L denotes a η-bonding cyclic anion ligand selected independently from the group consisting of a cyclopentadienyl group, indenyl group, tetrahydroindenyl group, fluorenyl group, tetrahydrofluorenyl group and octahydrofluorenyl group, and the ligand may optionally have 1–8 substituents, and the substituent(s) is (are) substituent(s) having 20 or less non-hydrogen atoms which is (are) independently selected from the group consisting of hydrocarbon groups of 1–20 carbon atoms, halogen atoms, halogen-substituted hydrocarbon groups of 1–12 carbon atoms, aminohydrocarbyl groups of 1–12 carbon atoms, hydrocarbyloxy groups of 1–12 carbon atoms, dihydrocarbylamino groups of 1–12 carbon atoms, hydrocarbylphosphino groups of 1–12 carbon atoms, silyl groups, aminosilyl groups, hydrocarbyloxysilyl groups of 1–12 carbon atoms, and halosilyl groups;

M denotes a transition metal having a formal oxidation number of +2, +3 or +4 which is selected from the group consisting of the transition metals belonging to Group 4 of the Periodic Table and is $\eta^5$-bonded to at least one ligand L;

W is a divalent substituent having 50 or less non-hydrogen atoms and bonded monovalently to L and M, respectively, thereby to form a metallo-cycle together with L and M;

X denotes an anionic σ-bonding type ligand having 60 or less non-hydrogen atoms which is selected independently from the group consisting of monovalent anionic σ-bonding type ligands, divalent anionic σ-bonding type ligands divalently bonded to M and divalent anionic σ-bonding type ligands bonded monovalently to L and M respectively;

X' denotes independently a neutral Lewis base coordinate compound having 40 or less non-hydrogen atoms;

j is 1 or 2, with a proviso that in the case of j being 2, the two ligands L may optionally bond to each other through a divalent group having 20 or less non-hydrogen atoms, and the divalent group is selected from the group consisting of hydrocarbadiyl groups of 1–20 carbon atoms, halohydrocarbadiyl groups of 1–12 carbon atoms, hydrocarbyleneoxy groups of 1–12 carbon atoms, hydrocarbyleneamino groups of 1–12 carbon atoms, silanediyl groups, halosilanediyl groups, and silyleneamino groups;

k is 0 or 1; and p is 0, 1 or 2, with a proviso that in the case of X being a monovalent anionic σ-bonding type ligand or a divalent anionic σ-bonding type ligand bonded to L and M, p is an integer which is smaller by at least 1 than the formal oxidation number of M, and in the case of X being a divalent anionic σ-bonding type ligands bonded only to M, p is an integer which is smaller by at least (j+1) than the formal oxidation number of M, and q is 0, 1 or 2.

6) A catalyst for olefin polymerization according to any of the above 1) to 5), wherein the activator compound (C-1) capable of reacting with the transition metal compound [B] to form a metal complex having catalytic activity is a compound represented by the following formula (2):

$$[L-H]^{d+}[M_m Q_p]^{d-} \qquad (2)$$

wherein $[L-H]^{d+}$ denotes a proton donating Brønsted acid, L denotes a neutral Lewis base, and d is an integer of 1–7; $[M_m Q_p]^{d-}$ denotes a compatible non-coordination anion, M denotes a metal or metalloid belonging to Groups 5–15 of the Periodic Table, Q is selected independently from the group consisting of hydrides, halides, dihydrocarbylamido groups of 2–20 carbon atoms, hydrocarbyloxy groups of 1–30 carbon atoms, hydrocarbon groups of 1–30 carbon atoms and substituted hydrocarbon groups of 1–40 carbon atoms, the number of Q, which is a halide, is 1 or less, m is an integer of 1–7, p is an integer of 2–14, d is as defined above, and p−m=d).

7) A method for production of polyolefins, comprising polymerizing or copolymerizing olefins in the presence of the catalyst for olefin polymerization according to any of the above 1) to 6).

According to one embodiment of the present invention, catalysts for olefin polymerization are provided, comprising a solid catalyst component comprising [A] a solid component having substantially no hydroxyl group, [B] a compound of a transition metal selected from Groups 3–11 of the Periodic Table, and [C] a mixture of an activator compound (C-1) capable of reacting with the transition metal compound [B] to form a metal complex having catalytic activity and an organoaluminum compound (C-2); and [D] a specific organomagnesium compound.

Such catalysts for olefin polymerization have high activity, and the organomagnesium compound used therein as a scavenger displays a high polymerization activity in a wide range of concentration. When the catalyst for olefin polymerization of the present invention is used for polymerization of ethylene, ethylene polymers having excellent particle properties, such as fluidity and packing density, can be obtained. Therefore, stirring in the reaction vessel can be efficiently performed and the polymerization heat can be effectively removed, whereby improvement of productivity can be expected.

BEST MODE FOR CARRYING OUT THE INVENTION

The present invention will be described in detail.

The solid component [A] having substantially no hydroxyl group used in the present invention can be obtained by subjecting a solid material (hereinafter referred to as "precursor of component [A]") to a treatment for removing hydroxyl groups from the surface of the precursor of the component [A].

Examples of the precursor of the component [A] include porous polymeric materials (the matrix including polyolefins or modified products thereof such as polyethylene, polypropylene, polystyrene, ethylenepropylene copolymer, ethylene-vinyl ester copolymer, styrene-divinylbenzene copolymer, partial or complete saponification products of ethylene-vinyl ester copolymer, thermoplastic resins such as polyamides, polycarbonates and polyesters, theremosetting resins such as phenolic resins, epoxy resins and melamine resins, etc.), inorganic solid oxides of elements belonging to Groups 2–4, 13 or 14 of the Periodic Table (e.g., silica, alumina, magnesia, magnesium chloride, zirconia, titania, boron oxide, calcium oxide, zinc oxide, barium oxide, vanadium pentoxide, chromium oxide, thorium oxide, and mixtures thereof or composite oxides thereof). Examples of composite oxides containing silica include composite oxides of silica with oxides of elements selected from those belonging to Group 2 or 13 of the Periodic Table, such as silica-magnesia and silica-alumina. In the present invention, the precursors of the component [A] are preferably selected from silica, alumina and composite oxides of silica with oxides of elements selected from those belonging to Group 2 or 13 of the Periodic Table. Of these inorganic solid oxides, silica is especially preferred.

The form of the silica products used as the precursors of the component [A] is not particularly limited, and they may be in any form, such as granule, sphere, aggregate, fume, etc. Preferred examples of commercially available silica products include SD3216.30, SP-9-10046, Davison Syloid TM 245, Davison 948 or Davison 952 [all of them being manufactured by Grace Davison Co. Ltd. (division of W.R. Davison Co. Ltd. (USA))], Aerosil 812 (manufactured by Degussa AG (Germany)), ES70X (manufactured by Crossfield Co. Ltd. (USA)), P-6 and P-10 (manufactured by Fuji Silicia Co., Ltd. (Japan)), etc.

The specific surface area of the component [A] used in the present invention obtained by a nitrogen gas adsorption method according to B.E.T. (Brunauer-Emmett-Teller) is preferably 10–1000 m$^2$/g, more preferably 100–600 m$^2$/g. One of the representative examples of the component [A] having such a high specific surface area is a component comprising a porous material having a number of pores.

The pore volume of the component [A] obtained by the nitrogen gas adsorption method in the present invention is preferably not more than 5 cm$^3$/g, more preferably 0.1–3 cm$^3$/g, and further preferably 0.2–2 cm$^3$/g.

The average particle diameter of the component [A] used in the present invention is not particularly limited. The average particle diameter of the component [A] is preferably 0.5–500 μm, more preferably 1–200 μm, and further preferably 10–100 μm.

The component [A] having substantially no hydroxyl group in the present invention can be obtained by subjecting the precursor of the component [A] to a chemical treatment to remove hydroxyl groups from the surface of the precursor of the component [A].

"Solid component has substantially no hydroxyl group" in the present invention means that hydroxyl groups are not detected on the surface of the solid component [A] by the following method (i) or (ii).

In the method (i), a given excess amount of dialkylmagnesium is added to a slurry obtained by dispersing the component [A] in a solvent to allow the hydroxyl groups on the surface of the component [A] to react with the dialkylmagnesium, then the amount of unreacted dialkylmagnesium remaining in the solvent is measured by a known method in order to obtain the amount of the dialkylmagnesium which has reacted with the hydroxyl groups on the surface of the component [A], and then the initial amount of the hydroxyl groups on the surface of the component [A] is obtained based on the amount of the reacted dialkylmagnesium. This method is based on the reaction of hydroxyl groups with dialkylmagnesium shown by the following reaction formula.

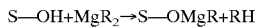

S—OH+MgR$_2$→S—OMgR+RH (in the formula, S denotes the solid material (the component [A]) and R denotes an alkyl group).

In the method (ii) which is preferred to the method (i), ethoxydiethylaluminum is used in place of the dialkylmagnesium. Specifically, in the method (ii), ethoxydiethylaluminum is reacted with hydroxyl groups on the surface of the component [A] to produce ethane gas, and the amount of the produced ethane gas is measured by a gas burette, and then the initial amount of hydroxyl group on the surface of the component [A] is obtained based on the amount of the produced ethane gas.

Furthermore, in the present invention, it is preferred to heat-treat the precursor of the component [A], thereby removing water (crystal water, adsorbed water, etc.). The heat treatment of the precursor of the component [A] can be carried out, for example, in an inert atmosphere or a reducing atmosphere at a temperature of preferably 150–1000° C., more preferably 250–800° C. for 1–50 hours.

In the present invention, more preferably, after the removal of water by the heat-treatment, the precursor of the component [A] is further subjected to a chemical treatment to remove a part or all of the hydroxyl groups from the surface of the precursor of the component [A], thereby obtaining the component [A].

The chemical treatment for removing a part or all of the hydroxyl groups from the precursor of the component [A] is desirably a chemical treatment which comprises contacting the precursor of the component [A] with an organometallic compound. Examples of the organometallic compound used for this chemical treatment are compounds of the elements belonging to Groups 2–13 of the Periodic Table, and the like. Of these compounds, especially preferred are organoaluminum compounds or organomagnesium compounds.

Examples of preferred organoaluminum compounds used for the chemical treatment of the precursor of the component [A] include compounds represented by the following formula (3).

$$AlR_nX_{3-n} \quad (3)$$

(in the formula, R denotes independently a straight chain, branched chain or cyclic alkyl group of 1–12 carbon atoms or an aryl group of 6–20 carbon atoms, X denotes independently a halide, a hydride or an alkoxide group of 1–10 carbon atoms, and n is a real number of more than 0 and not more than 3).

The compounds represented by the above formula (3) may be used alone or in combination of two or more. Examples of the group R in the formula (3) include a methyl group, ethyl group, propyl group, butyl group, hexyl group, octyl group, decyl group, phenyl group, tolyl group, etc.

Examples of the group X in the formula (3) include a methoxy group, ethoxy group, butoxy group, hydrogen atom, chlorine atom, etc.

Examples of the organoaluminum compounds used for the chemical treatment of the precursor of the component [A] include trialkylaluminum compounds such as trimethylaluminum, triethylaluminum, tributylaluminum, trihexylaluminum, trioctylaluminum and tridecylaluminum, and reaction products of these trialkylaluminum compounds with alcohols (e.g., methyl alcohol, ethyl alcohol, butyl alcohol, pentyl alcohol, hexyl alcohol, octyl alcohol, decyl alcohol, etc.).

Examples of the reaction products include methoxydimethylaluminum, ethoxydiethylaluminum, butoxydibutylaluminum, etc. In the production of these reaction products, the ratio of the trialkylaluminum to the alcohol in molar ratio of Al/OH is in the range of preferably 0.3–20, more preferably 0.5–5, further preferably 0.8–3.

Examples of preferred organomagnesium compounds used for the chemical treatment of the precursor of the component [A] include compounds represented by the following formula (4).

$$MgR_nX_{2-n} \quad (4)$$

(in the formula, R denotes independently a straight chain, branched chain or cyclic alkyl group of 1–12 carbon atoms or an aryl group of 6–20 carbon atoms, X denotes independently a halide, a hydride or an alkoxide group of 1–10 carbon atoms, and n is 1 or 2).

The compounds represented by the above formula (4) may be used alone or in combination of two or more.

Examples of the group R in the formula (4) include a methyl group, ethyl group, n-propyl group, isopropyl group, n-butyl group, isobutyl group, sec-butyl group, tert-butyl group, pentyl group, hexyl group, octyl group, decyl group, phenyl group, tolyl group, etc.

Examples of the group X in the formula (4) include a methoxy group, ethoxy group, butoxy group, hydrogen atom, chlorine atom, etc.

Examples of the organomagnesium compounds used for the chemical treatment of the precursor of the component [A] include di-sec-butylmagnesium, n-butylethylmagnesium, n-butyl-n-octylmagnesium, etc.

In the chemical treatment of the precursor of the component [A], the above organoaluminum compound and organomagnesium compound may be used in admixture.

In the case of obtaining the component [A] by the chemical treatment of the precursor of the component [A], the organometallic compound is used in an amount equal to or larger than the molar amount of the hydroxyl groups present on the surface of the precursor of the component [A]. The amount of the organometallic compound used for the chemical treatment is preferably 1–10 times, more preferably 1–5 times, further preferably 1–2 times, especially preferably 1–1.5 times, most preferably 1–1.3 times the molar amount of the hydroxyl groups present on the surface of the precursor of the component [A].

Moreover, in the present invention, the component [A] is especially preferably a silica having substantially no hydroxyl group. The silica is preferably one obtained by a method which comprises heat-treating silica at a temperature of preferably not lower than 150° C., more preferably not lower than 250° C., to have the amount of hydroxyl groups on the surface being 0.05–10 mmols per 1 g of silica and treating the thus pretreated silica with an organometallic compound. As the organometallic compound used for the treatment of silica (precursor of the component [A]), an organoaluminum compound is preferred, and the organoaluminum compound of the formula (3) is especially preferred. The amount of the organoaluminum compound to be used is preferably 1–10 times the molar amount of the hydroxyl groups on the surface of the pretreated silica.

The amount of the hydroxyl groups on the surface of the pretreated silica is more preferably 0.1–5 mmols, most preferably 0.5–2 mmols per 1 g of the pretreated silica.

In addition, clays, clay minerals and ion-exchangeable laminar compounds treated with organoaluminum compounds which are mentioned hereafter as examples of the component [C] can also be used as the component [A].

Next, the compound [B] which is a compound of a transition metal selected from Groups 3–11 of the Periodic Table will be described below.

As examples of the component [B] used in the present invention, the compounds represented by the following formula (1) are included:

$$L_j W_k M X_p X'_q \qquad (1)$$

(in the formula, L denotes independently a η-bonding type cyclic anion ligand selected from the group consisting of cyclopentadienyl group, indenyl group, tetrahydroindenyl group, fluorenyl group, tetrahydrofluorenyl group and octahydrofluorenyl group, and, the ligand optionally may have 1–8 substituents, and the substituents are those having 20 or less non-hydrogen atoms which are independently selected from hydrocarbon groups of 1–20 carbon atoms, halogen atoms, halogen-substituted hydrocarbon groups of 1–12 carbon atoms, aminohydrocarbyl groups of 1–12 carbon atoms, hydrocarbyloxy groups of 1–12 carbon atoms, dihydrocarbylamino groups of 1–12 carbon atoms, hydrocarbylphosphino groups of 1–12 carbon atoms, silyl groups, aminosilyl groups, hydrocarbyloxysilyl groups of 1–12 carbon atoms and halosilyl groups, M denotes a transition metal having a formal oxidation number of +2, +3 or +4 which is selected from the group of the transition metals belonging to Group 4 of the Periodic Table and is η$^5$-bonded to at least one ligand L, W is a divalent substituent having 50 or less non-hydrogen atoms and bonded monovalently to L and M, respectively, thereby to form a metallo-cycle together with L and M, X denotes an anionic σ-bonding type ligand having 60 or less non-hydrogen atoms which is selected from the group consisting of monovalent anionic σ-bonding type ligands, divalent anionic σ-bonding type ligands bonded divalently to M and divalent anionic σ-bonding type ligands bonded monovalently to L and M, respectively, X' denotes independently a neutral Lewis base coordination compound having 40 or less non-hydrogen atoms, j is 1 or 2, with a proviso that in the case of j being 2 two ligands L may optionally bond to each other through a divalent group having 20 or less non-hydrogen atoms, and the divalent group is selected from the group consisting of hydrocarbadiyl groups of 1–20 carbon atoms, halohydrocarbadiyl groups of 1–12 carbon atoms, hydrocarbyleneoxy groups of 1–12 carbon atoms, hydrocarbyleneamino groups of 1–12 carbon atoms, silanediyl groups, halosilanediyl groups, and silyleneamino groups, k is 0 or 1, and p is 0, 1 or 2, with a proviso that in the case of X being a monovalent anionic σ-bonding type ligand or a divalent anionic σ-bonding type ligand bonded to L and M, p is an integer which is smaller by at least 1 than the formal oxidation number of M, and in the case of X being a divalent anionic σ-bonding type ligand bonded to only M, p is an integer which is smaller by at least (j+1) than the formal oxidation number of M, and q is 0, 1 or 2).

Examples of the ligand X in the compound of the above formula (1) include hydrides, halides, hydrocarbon groups of 1–60 carbon atoms, hydrocarbyloxy groups of 1–60 carbon atoms, hydrocarbylamide groups of 1–60 carbon atoms, hydrocarbylphosphide groups of 1–60 carbon atoms, hydrocarbylsulfide groups of 1–60 carbon atoms, silyl groups, composite groups of these groups, etc.

Examples of the neutral Lewis base coordination compound X' in the compound of the above formula (1) are phosphines, ethers, amines, olefins of 2–40 carbon atoms, dienes of 1–40 carbon atoms, divalent groups derived from these compounds, etc.

As examples of the component [B] used in the present invention, the complex compounds represented by the following formula (5) are included:

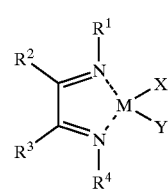

(5)

(in the formula, R$^1$ and R$^4$ denote independently of one another an aliphatic hydrocarbon group of 1–20 carbon atoms or an aromatic group of 7–20 carbon atoms in total having a hydrocarbon group(s) on the ring, R$^2$ and R$^3$ denote independently of one another a hydrogen atom or a hydrocarbon group of 1–20 carbon atoms, and R² and R³ may bond to each other to form a ring, X and Y denote independently of one another a halogen atom or a hydrocarbon group of 1–20 carbon atoms, and M denotes nickel or palladium).

The aliphatic hydrocarbon groups of 1–20 carbon atoms of R¹ and R⁴ in the above formula (5) include a straight chain or branched chain alkyl group of 1–20 carbon atoms, a cycloalkyl group of 3–20 carbon atoms, etc., and more specifically a methyl group, ethyl group, n-propyl group, isopropyl group, n-butyl group, isobutyl group, sec-butyl group, tert-butyl group, pentyl group, hexyl group, octyl group, decyl group, tetradecyl group, hexadecyl group, octadecyl group, cylopentyl group, cyclohexyl group, cyclooctyl group, etc. The ring of the cycloalkyl group may have a suitable substituent such as a lower alkyl group.

Examples of the aromatic groups of 7–20 carbon atoms in total having a hydrocarbon group(s) on the ring are a phenyl group, naphthyl group, etc. having on the aromatic ring one or more straight chain, branched chain or cyclic alkyl groups of 1–10 carbon atoms. As R¹ and R⁴, aromatic groups having a hydrocarbon group(s) on the ring and especially the 2,6-diisopropylphenyl group, are preferred. R¹ and R⁴ may be the same or different.

Examples of the hydrocarbon group of 1–20 carbon atoms of R² and R³ include straight chain or branched chain alkyl groups of 1–20 carbon atoms, cycloalkyl groups of 3–20 carbon atoms, aryl groups of 6–20 carbon atoms, aralkyl groups of 7–20 carbon atoms, etc. Examples of the straight chain or branched chain alkyl groups of 1–20 carbon atoms and cycloalkyl groups of 3–20 carbon atoms include the same groups as listed for the examples of the aliphatic hydrocarbon group of 1–20 carbon atoms of the above R¹ and R⁴. Examples of the aryl groups of 6–20 carbon atoms include a phenyl group, tolyl group, xylyl group, naphthyl group, methylnaphthyl group, etc, and the examples of the aralkyl groups of 7–20 carbon atoms include a benzyl group, phenethyl group, etc.

R² and R³ may be the same or different. They also may bond to each other to form a ring. Examples of the halogen atoms of X and Y include chlorine, bromine, iodine atoms, etc., and the examples of the hydrocarbon groups of 1–20 carbon atoms of X and Y include the same as listed for the examples of the hydrocarbon groups of 1–20 carbon atoms of the above R² and R³. As X and Y, a bromine atom or methyl group is preferred. X and Y may be the same or different.

In addition, as examples of the component [B] used in the present invention, complexes of the compounds represented by the following formula (6) with nickel compounds may be mentioned:

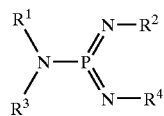

(6)

(in the formula, R¹, R², R³ and R⁴ denote independently of one another a straight chain, branched chain or cyclic alkyl group of 1–12 carbon atoms, an aryl group of 6–20 carbon atoms, hydrogen or a vinyl group).

Examples of the nickel compounds include bis(1,5-cyclooctadiene)nickel(0), bis(cyclooctatetraene)nickel(0), tetracarbonyl-nickel(0), bis(acetylacetonato)nickel(II), nickel acetate(II), bis(allyl)nickel(II), etc.

In the present invention, the transition metal compounds represented by the above formula (1) (j=1) are preferred as the component [B].

As preferred examples of the compounds represented by the formula (1) (j=1), the compounds represented by the following formula (7) are included:

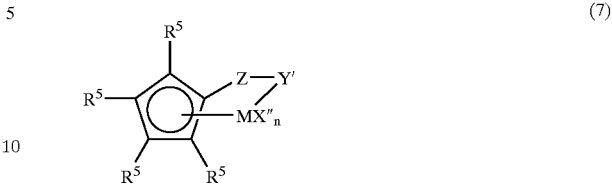

(7)

(in the formula, M denotes a transition metal selected from the group consisting of titanium, zirconium and hafnium and having a formal oxidation number of +2, +3 or +4, R⁵ denotes a substituent having 20 or less non-hydrogen atoms which is independently selected from the group consisting of hydrogen atoms, hydrocarbon groups of 1–8 carbon atoms, silyl groups, germyl groups, cyano groups, halogen atoms and composite groups thereof, with a proviso that when the substituent R⁵ is a hydrocarbon group of 1–8 carbon atoms, a silyl group or germyl group, the two adjacent substituents R⁵ may bond to each other to form a divalent group, thereby to form a ring together with a bond between two carbon atoms of the cyclopentadienyl ring which respectively bond to the two adjacent substituents R⁵, X" denotes a substituent having 20 or less non-hydrogen atoms which is independently selected from the group consisting of hydrides, halides, hydrocarbon groups of 1–20 carbon atoms, hydrocarbyloxy groups of 1–18 carbon atoms, hydrocarbylamino groups of 1–18 carbon atoms, silyl group, hydrocarbylamide groups of 1–18 carbon atoms, hydrocarbylphosphide groups of 1–18 carbon atoms, hydrocarbylsulfide groups of 1–18 carbon atoms, and composite groups of these groups, and the two substituents X" optionally may form together a neutral conjugated diene of 4–30 carbon atoms or a divalent group, Y' denotes —O—, —S—, —NR*— or —PR*—, in which R* denotes a hydrogen atom, a hydrocarbon group of 1–12 carbon atoms, a hydrocarbyloxy group of 1–8 carbon atoms, silyl group, a halogenated alkyl group of 1–8 carbon atoms, a halogenated aryl group of 6–20 carbon atoms or a composite group thereof, and Z denotes SiR*₂, CR*₂, SiR*₂SiR*₂, CR*₂CR*₂, CR*=CR*, CR*₂SiR*₂ or GeR*₂, in which R* is as defined above, and n is 1, 2 or 3).

Examples of the component [B] used in the present invention are compounds as listed below.

Bis(cyclopentadienyl)methylzirconium hydride, bis(cyclopentadienyl)ethylzirconium hydride, bis(cyclopentadienyl)phenylzirconium hydride, bis(cyclopentadienyl)benzylzirconium hydride, bis(cyclopentadienyl)neopentylzirconium hydride, bis(methylcyclopentadienyl)zirconium dimethyl, bis(n-butylcyclopentadienyl)zirconium dimethyl, bis(indenyl)zirconium dimethyl, (pentamethylcyclopentadienyl)(cyclopentadienyl)zirconium dimethyl, bis(cyclopentadienyl)zirconium dimethyl, bis(pentamethylcyclopentadienyl)zirconium dimethyl, bis(cyclopentadienyl)zirconium diphenyl, bis(cyclopentadienyl)zirconium dibenzyl, bis(cyclopentadienyl)zirconium dihydride, bis(fluorenyl)zirconium dimethyl, ethylene-bis(indenyl)zirconium dimethyl, ethylene-bis(indenyl)zirconium diethyl, ethylene-bis(indenyl)zirconium dihydride, ethylenebis(4,5,6,7-tetrahydro-1-indenyl)zirconium dimethyl, ethylenebis(4-methyl-1-indenyl)zirconium dimethyl, ethylenebis(5- methyl-1-indenyl)zirconium dimethyl, ethylenebis(6-methyl-1-indenyl)zirconium dimethyl, ethylenebis(7-methyl-1-indenyl)zirconium dimethyl, ethylenebis(5-methoxy-1-indenyl)zirconium dimethyl, ethylenebis(2,3-dimethyl-1-indenyl)zirconium dimethyl, ethylenebis(4,7-dimethyl-1-indenyl)dimethylzirconium, ethylenebis(4,7-dimethoxy-1-indenyl)zirconium dimethyl, methylene-bis(cyclopentadienyl)zirconium dihydride, methylene-bis(cyclopentadienyl)zirconium dimethyl, isopropylidene(cyclopentadienyl)zirconium dihydride, isopropylidene(cyclopentadienyl)zirconium dimethyl, isopropylidene(cyclopentadienyl-fluorenyl)zirconium dihydride, isopropylidene(cyclopentadienyl-fluorenyl)zirconium dimethyl, silylenebis(cyclopentadienyl)zirconium dihydride, silylenebis(cyclopentadienyl)zirconium dimethyl, dimethylsilylene(cyclopentadienyl)zirconium dihydride, dimethylsilylene(cyclopentadienyl)zirconium dimethyl, [(N-t-butylamido)(tetramethyl-$\eta^5$-cyclopentadienyl)-1,2-ethanediyl]titanium dimethyl, [(N-t-butylamido) (tetramethyl-$\eta^5$-cyclopentadienyl)-dimethylsilane]titanium dimethyl, [(N-methylamido)-(tetramethyl-$\eta^5$-cyclopentadienyl)dimethylsilane]titanium dimethyl, [(N-phenylamido)(tetramethyl-$\eta^5$-cyclopentadienyl)dimethylsilane]titanium dimethyl, [(N-benzylamido)(tetramethyl-$\eta^5$-cyclopentadienyl)-dimethylsilane]titanium dimethyl, [(N-t-butylamido)($\eta^5$-cyclopentadienyl)-1,2-ethanediyl]titanium dimethyl, [(N-t-butylamido) (5-cyclopentadienyl)dimethylsilane]-titanium dimethyl, [(N-methylamido) ($\eta^5$-cyclopentadienyl)-1,2-ethanediyl]titanium dimethyl, [(N-methylamido)($\eta^5$-cyclopentadienyl)dimethylsilane]-titanium dimethyl, [(N-t-butylamido)($\eta^5$-indenyl)-dimethylsilane]titanium dimethyl, [(N-benzylamido) ($\eta^5$-indenyl)dimethylsilane]titanium dimethyl, etc.

Additional examples of the component [B] used in the present invention include compounds having the names obtained by replacing the portion of "dimethyl" in the above-listed zirconium and titanium compounds (which is the last portion of the names of the compounds, namely, which appears just behind the portion "zirconium" or "titanium" and which corresponds to the portion of "X''" in the above formula (7)) with any of those enumerated below.

"dibenzyl", "2-(N,N-dimethylamino)benzyl", "2-butene-1,4-diyl", "s-trans-$\eta^4$-1,4-diphenyl-1,3-butadiene", "s-trans-$\eta^4$-3-methyl-1,3-pentadiene", "S-trans-$\eta^4$-1,4-dibenzyl-1,3-butadiene", "s-trans-$\eta^4$-2,4-hexadiene", "s-trans-$\eta^4$-1,3-pentadiene", "s-trans-$\eta^4$-1,4-ditolyl-1,3-butadiene", "s-trans-$\eta^4$-1,4-bis(trimethylsilyl)-1,3-butadiene", "s-cis-$\eta^4$-1,4-diphenyl-1,3-butadiene", "s-cis-$\eta^4$-3-methyl-1,3-pentadiene", "s-cis-$\eta^4$-1,4-dibenzyl-1,3-butadiene", "s-cis-$\eta^4$-2,4-hexadiene", "s-cis-$\eta^4$-1,3-pentadiene", "s-cis-$\eta^4$-1,4-ditolyl-1,3-butadiene", "s-cis-$\eta^4$-1,4-bis(trimethylsilyl)-1,3-butadiene", etc.

The transition metal compound [B] used in the present invention can be synthesized by generally known methods. Examples of the preferred methods for synthesis of the transition metal compounds used as the component [B] in the present invention include that disclosed in U.S. Pat. No. 5,491,246.

The transition metal compound component [B] may be used alone or in combination.

The mixture [C] used as one component of the catalyst of the present invention (hereinafter sometimes referred to as "component [C]") will be described below. The component [C] is a mixture of the following compounds.

(C-1) An activator compound capable of reacting with the transition metal compound [B] to form a metal complex having catalytic activity;
(C-2) An organoaluminum compound.

As the component (C-1), for example, a compound defined by the following formula (8) is included:

$$[L-H]^{d+}[M_mQ_p]^{d-} \qquad (8)$$

In the above formula, $[L-H]^{d+}$ denotes a proton donating Brønsted acid, and L denotes a neutral Lewis base.

In the above formula, $[M_mQ_p]^{d-}$ denotes a compatible non-coordination anion, M denotes a metal or metalloid selected from Groups 5–15 of the Periodic Table, Q is independently a hydride, a dialkylamide group, a halide, an alkoxide group, an aryloxide group, a hydrocarbon group, or a substituted hydrocarbon group of 20 or less carbon atoms, and the number of Q, which is a halide, is 1 or less, m is an integer of 1–7, p is an integer of 2–14, d is an integer of 1–7, and p−m=d.

In the present invention, preferred examples of the component (C-1) are those represented by the following formula (9):

$$[M_mQ_n](G_q(T-H))_z]^{d-} \qquad (9)$$

In the above formula, M is a metal or metalloid selected from Groups 5–15 of the Periodic Table.

Q is as defined in the formula (8), G is a polyvalent hydrocarbon group bonding to boron and T and having a valence of r+1, T is O, S, NR or PR where R is a hydrocarbyl group, trihydrocarbylsilyl group, trihydrocarbylgermanium group or hydrogen, and m is an integer of 1–7, n is an integer of 0–7, q is an integer of 0 or 1, r is an integer of 0–3, z is an integer of 1–8, d is an integer of 1–7, and n+z−m=d.

More preferred examples of the component (C-1) are those which are represented by the following formula (10):

$$[L-H]^+[BQ_3Q']^- \qquad (10)$$

In the above formula, $[L-H]^+$ is a proton donating Brønsted acid, and L is a neutral Lewis base, $[BQ_3Q']^-$ is a compatible non-coordination anion, Q is a pentafluorophenyl group, and the group Q' is a substituted aryl group of 6–20 carbon atoms having one OH group as a substituent.

Examples of the compatible non-coordination anions in the present invention are tetrakisphenyl borate, tri(p-tolyl)(phenyl) borate, tris(pentafluorophenyl)(phenyl) borate, tris(2,4-dimethylphenyl)(hydroxyphenyl) borate, tris(3,5-dimethylphenyl)(phenyl) borate, tris(3,5-di-trifluoromethylphenyl)(phenyl)borate, tris(pentafluorophenyl)(cyclohexyl)borate, tris(pentafluorophenyl)-(naphthyl) borate, tetrakis(pentafluorophenyl) borate, triphenyl(hydroxyphenyl) borate, diphenyl-di(hydroxyphenyl) borate, triphenyl(2,4-dihydroxyphenyl) borate, tri(p-tolyl)(hydroxyphenyl) borate, tris(pentafluorophenyl)(hydroxyphenyl) borate, tris(2,4-dimethylphenyl)(hydroxyphenyl) borate, tris(3,5-dimethylphenyl)(hydroxyphenyl) borate, tris(3,5-di-trifluoromethylphenyl)(hydroxyphenyl) borate, tris(pentafluorophenyl)(2-hydroxyethyl) borate, tris(pentafluorophenyl)(4-hydroxybutyl) borate, tris(pentafluorophenyl)(4-hydroxy-cyclohexyl) borate, tris(pentafluorophenyl)(4-(4'-hydroxyphenyl)phenyl) borate, tris(pentafluorophenyl)(6-hydroxy-2-naphthyl) borate, etc. The most preferred is tris(pentafluorophenyl)(4-hydroxyphenyl) borate.

Other examples of the preferred compatible non-coordination anions include the above enumerated borates in which the hydroxyl group is replaced with an NHR group, wherein R is preferably a methyl group, ethyl group or tert-butyl group. Examples of the proton donating Brønsted acids include trialkyl group-substitution type ammonium cations such as triethylammonium, tripropylammonium, tri (n-butyl)ammonium, trimethylammonium, tributylammonium and tri(n-octyl)ammonium. Moreover, N,N-dialkylanilinium cations such as N,N-dimethylanilinium, N,N-diethylanilinium, N,N-2,4,6-pentamethylanilinium and N,N-dimethylbenzylanilinium are also suitable.

Further, dialkylammonium cations such as di-(i-propyl) ammonium and dicyclohexylammonium are also suitable, and triarylphosphonium cations such as triphenylphosphonium, tri(methylphenyl)phosphonium and tri(dimethylphenyl)phosphonium, or dimethylsulfonium, diethylsulfonium, diphenylsulfonium, etc. are also suitable.

In addition, as the component (C-1), for example, clays, clay minerals or ion-exchangeable laminar compounds are included.

The clays used in the present invention are preferably those which are mainly composed of clay minerals, and the ion-exchangeable laminar compounds are preferably those which have a crystal structure in which the planes formed by ionic bonding or the like are stacked in parallel with each other by a weak bonding force and have exchangeable ions. As examples of the clays, clay minerals or ion-exchangeable laminar compounds, ion crystalline compounds having laminar crystal structures such as hexagonal close packing type, antimony type, $CdCl_2$ type and $CdI_2$ type, etc. are included. These clays, clay minerals or ion-exchangeable laminar compounds are not limited to natural ones, but include artificially synthesized products.

Examples of the clays and clay minerals include kaolin, bentonite, kibushi-clay, gairome-clay, allophane, hisingerite, pyrophyllite, mica group, montmorillonite group, vermiculite, chlorite group, palygorskite, kaolinite, nacrite, dickite, halloysite, etc. Examples of the ion-exchangeable laminar compounds include crystalline acidic salts of polyvalent metals, such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot H_2O$, $\alpha$-$Sn(HPO_4)_2 \cdot H_2O$, $\gamma$-$Zr(HPO_4)_2$, $\gamma$-$Ti(HPO_4)_2$, and $\gamma$-$Ti(NH_4PO_4)_2 \cdot H_2O$.

These clays, clay minerals or ion-exchangeable laminar compounds preferably have a pore volume of pores of 2 nm or more in radius measured by the mercury penetration method of not less than 0.1 $cm^3/g$, especially preferably 0.3–5 $cm^3/g$, from the view-point of polymerization activity. The measurement of the pore volume is conducted by the mercury penetration method in the range of $2-3 \times 10^2$ nm in pore radius using a mercury porosimeter.

The clays and clay minerals used in the present invention can be subjected to a chemical treatment. As the chemical treatment, either a surface treatment to remove impurities adhered to the surfaces or a treatment to affect their crystalline structure is used. Specifically, the treatments include acid treatment, alkali treatment, salt treatment, organic material treatment, etc. The acid treatment removes the impurities on the surface and, in addition, dissolves out the cations such as Al, Fe and Mg in the crystal structure, thereby increasing the surface area. By the alkali treatment, the crystalline structure of the clay is broken, resulting in a change of the structure of the clay. Moreover, by the salt treatment and organic material treatment, ion composites, molecule composites, organic derivatives, etc. are formed, and the surface area and interlaminar distance can be changed.

The ion-exchangeable laminar compounds used in the present invention may be the laminar compounds in the state where the interlaminar distances are enlarged by exchanging the interlaminar exchangeable ions with other large and bulky ions by taking advantage of the ion-exchanging ability. Here, the bulky ions play a role of props supporting the laminar structure, and are called pillars. Furthermore, introduction of another substance (guest compound) between the layers of a laminar substance is called intercalation.

Examples of the guest compounds to be intercalated include cationic inorganic compounds such as $TiCl_4$ and $ZrCl_4$; metal alcoholates such as $Ti(OR)_4$, $Zr(OR)_4$, $PO(OR)_3$ and $B(OR)_3$ (R is a hydrocarbon group, etc.); metal hydroxide ions such as $[Al_{13}O_4(OH)_{24}]^{7+}$, $[Zr_4(OH)_{14}]^{2+}$ and $[Fe_3O(OCOCH_3)_6]^+$; etc. These compounds may be used either alone or in a combination of two or more.

Furthermore, upon intercalating these compounds, a polymer obtained by hydrolyzing metal alcoholates such as $Si(OR)_4$, $Al(OR)_3$ and $Ge(OR)_4$ (R is a hydrocarbon group, etc.), etc., or colloidal inorganic compounds such as $SiO_2$, etc. may be present at the same time. Other examples of the pillars include oxides produced by intercalating the above hydroxide ions between layers, followed by dehydrating by heating.

The clays, clay minerals or ion-exchangeable laminar compounds used in the present invention may be used as they are or may be used after subjecting them to grinding by a ball mill or screening. Furthermore, they may be used after adding and adsorbing water or after a dehydration treatment by heating. They may be used either alone or in combination of two or more. Among them, preferred are clays or clay minerals, and especially preferred is montmorillonite.

In the present invention, these activator compound components (C-1) may be used either alone or in combination.

Next, the organoaluminum compound (C-2) used in the present invention will be described. Examples of the component (C-2) of the present invention include trimethylaluminum, triethylaluminum, tributylaluminum, trihexylaluminum, trioctylaluminum, tridecylaluminum, etc. and the reaction products of these alkylaluminums with alcohols such as methyl alcohol, ethyl alcohol, butyl alcohol, pentyl alcohol, hexyl alcohol, octyl alcohol and decyl alcohol, for example, dimethylmethoxyaluminum, diethylethoxyaluminum and dibutylbutoxyaluminum, etc.

In the production of these reaction products, the ratio of the alkylaluminum and the alcohol, namely, Al/OH, is in the range of preferably 0.3–20, more preferably 0.5–5, further preferably 0.8–3.

In the present invention, the amount of the component (C-2) is 0.01–1000 times, preferably 0.1–100 times, more preferably 0.5–10 times the molar amount of the component (C-1).

The reaction of the component (C-1) with the component (C-2) is carried out between room temperature and 150° C. in an inert reaction medium, for example, aliphatic hydrocarbons such as hexane and heptane and aromatic hydrocarbons such as benzene and toluene. As for the sequence of the reactions, any of a method of adding the component (C-2) to the component (C-1), a method of adding the component (C-1) to the component (C-2), and a method of adding them simultaneously can be employed.

In addition, organoaluminumoxy compounds such as methylalumoxane can be used as the component [C]. Preferred organoaluminumoxy compounds used in the present invention can be produced, for example, by the methods shown below, and are usually obtained as solutions in a hydrocarbon solvent.

(1) A method of adding an organoaluminum compound such as trialkylaluminum to a suspension, in a hydrocarbon medium, of a compound containing adsorbed water or a salt containing crystal water, for example, magnesium chloride hydrate, copper sulfate hydrate, aluminum sulfate hydrate, nickel sulfate hydrate, cerous chloride hydrate, or the like, thereby allowing the adsorbed water or crystal water to react with the organoaluminum compound.

(2) A method of allowing water, ice or water vapor to directly act on an organoaluminum compound such as a trialkylaluminum in a medium such as benzene, toluene, ethyl ether or tetrahydrofuran.

(3) A method of reacting an organoaluminum compound such as a trialkylaluminum with an organotin oxide such as dimethyltin oxide or dibutyltin oxide in a medium such as decane, benzene or toluene.

Examples of the organoaluminum compounds used for the preparation of the organoaluminumoxy compounds are trialkylaluminum compounds such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminum compounds such as tricyclohexylaluminum and tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; dialkylaluminum aryloxides such as diethylaluminum phenoxide; etc.

Of these compounds, trialkylaluminums and tricycloalkylaluminums are preferred, and trimethylaluminum is especially preferred.

The organoaluminumoxy compounds are used in such a form as containing a small amount of the organoaluminum compound which is a starting material.

Method of combination of the components [A], [B] and [C] is not particularly limited, and, for example, a method of previously contacting the component [B] with the component [C], and then contacting the component [A] therewith, a method of previously contacting the component [A] with the component [C], and then contacting the component [B] therewith, and the like can be employed. When the components are contacted with each other, the contacting of the components [B] and [C] is preferably carried out in a good solvent for the component [B]. When the component [A] is contacted with the other components [B] and [C], the contacting is preferably carried out in a poor solvent for the component [B].

The good solvents for the component [B] include, for example, aromatic compounds such as benzene, toluene and xylene. The poor solvents for the component [B] include, for example, straight chain or branched chain hydrocarbon compounds such as isobutane, pentane, isopentane, hexane, heptane, octane, decane, dodecane and kerosene.

The amounts and the ratio of the amounts of these components are also not particularly limited, but it is preferred to use the component [C] in an amount sufficient to result in the reaction of the component [B].

In the present invention, the component [B] is used in an amount of preferably $5 \times 10^{-6}$ to $10^{-2}$ mol, more preferably $10^{-5}$ to $10^{-3}$ mol based on 1 g of the component [A].

When the components [A], [B] and [C] are contacted, unreacted component [B] is sometimes present in the reaction solvent depending on conditions, and the unreacted component [B] is removed by washing with a solvent in which the component [B] is soluble or by heating and/or treating under reduced pressure, or by other methods.

The solid catalyst component comprising [A], [B] and [C] of the present invention may be used as such or after being subjected to prepolymerization.

In the prepolymerization, it is desired that the component [B] is used in an amount of preferably $1 \times 10^{-5}$ to $5 \times 10^{-3}$ mol, more preferably $5 \times 10^{-5}$ to $10^{-3}$ mol based on 1 g of the component [A]. The prepolymerization temperature is usually preferably $-20°$ C.–$80°$ C., more preferably $0°$ C.–$50°$ C., and the prepolymerization time is usually preferably about 0.5–100 hours, more preferably about 1–50 hours though it may vary depending on the prepolymerization temperature.

The amount of polymer produced by the prepolymerization is preferably about 0.1–500 g, more preferably 0.3–300 g, especially preferably 1–100 g based on 1 g of the solid component.

The olefin used for the prepolymerization is preferably selected from the olefins used in the polymerization mentioned hereinafter. Of the olefins, ethylene is especially preferred.

The solid catalyst component comprising [A], [B] and [C] of the present invention is preferably added to a polymerizer as a slurry in an aliphatic hydrocarbon or alicyclic hydrocarbon mentioned hereinafter.

Next, the component [D] used in the present invention will be described below.

The compound [component (i)] represented by the formula $(Mt)_\alpha (Mg)_\beta (R^1)_a (R^2)_b$ [in the formula, Mt is a metal atom belonging to Group 1–3 of the Periodic Table, $R^1$ and $R^2$ are hydrocarbon groups of 2–20 carbon atoms, and $\alpha$, $\beta$, a and b are numerals satisfying the following relations: $0 \leq \alpha$, $0 < \beta$, $0 \leq a$, $0 \leq b$, $a+b>0$, and $r\alpha + 2\beta = a+b$ (where r is a valence of Mt)] is shown herein in the form of a complex compound of organomagnesium, nevertheless, it is meant to include all of the $R_2Mg$ and complexes thereof with other metal compounds. The relationship $r\alpha + 2\beta = a+b$ among $\alpha$, $\beta$, a and b shows the stoichiometry of the valence of the metal atom and the substituent.

The hydrocarbon groups represented by $R^1$ and $R^2$ are alkyl groups, cycloalkyl groups or aryl groups, and include, for example, a methyl group, ethyl group, n-propyl group, isopropyl group, n-butyl group, isobutyl group, sec-butyl group, tert-butyl group, pentyl group, hexyl group, octyl group, decyl group, phenyl group, tolyl group, etc. $R^1$ is preferably an alkyl group, and especially preferably a primary alkyl group.

In the case of $\alpha > 0$, as the metal atom Mt, the metal elements belonging to Groups 1–3 of the Periodic Table can be used, and examples thereof include lithium, sodium, potassium, beryllium, zinc, boron, aluminum, etc., and especially preferred are aluminum, boron, beryllium and zinc.

The ratio of magnesium to the metal atom Mt, namely, $\beta / \alpha$ can be optionally set, but is preferably 0.1–50, especially preferably 0.5–10. Furthermore, when a certain organomagnesium compound of $\alpha = 0$ is used, in the case of $R^1$ being, for example, sec-butyl, the compound is soluble in a hydrocarbon solvent and such compound also gives preferable results in the present invention.

$R^1$ and $R^2$ in the case of $\alpha = 0$ in the formula $(Mt)_\alpha (Mg)_\beta (R^1)_a (R^2)_b$ are desirably one of the following three groups (1), (2) and (3).

(1) At least one of $R^1$ and $R^2$ is a secondary or a tertiary alkyl group of 4–6 carbon atoms, preferably both of $R^1$ and $R^2$ have 4–6 carbon atoms and at least one of them is a secondary or tertiary alkyl group.

(2) $R^1$ and $R^2$ are alkyl groups different in the number of carbon atoms, preferably $R^1$ is an alkyl group of 2 or 3 carbon atoms and $R^2$ is an alkyl group of 4 or more carbon atoms.

(3) At least one of $R^1$ and $R^2$ is a hydrocarbon group of 6 or more carbon atoms, preferably $R^1$ and $R^2$ are both alkyl groups of 6 or more carbon atoms.

These groups will be specifically shown below.

Examples of the secondary or tertiary alkyl groups of 4–6 carbon atoms in the above (1) include sec-butyl, tert-butyl, 2-methylbutyl, 2-ethylpropyl, 2,2-dimethylpropyl, 2-methylpentyl, 2-ethylbutyl, 2,2-dimethylbutyl, 2-methyl-2-ethylpropyl, etc., and sec-butyl is especially preferred.

Examples of the alkyl groups of 2 or 3 carbon atom in the above (2) include an ethyl group and propyl group, and an ethyl group is especially preferred. Examples of the alkyl groups of 4 or more carbon atoms include a butyl group, amyl group, hexyl group, octyl group, etc., and a butyl group and hexyl group are especially preferred.

Examples of the alkyl groups of 6 or more carbon atoms in the above (3) include a hexyl group, octyl group, decyl group, phenyl group, etc., and an alkyl group is preferred, and a hexyl group is especially preferred.

In general, when the number of carbon atoms of the alkyl group increases, the compound becomes more soluble in a hydrocarbon solvent, but the viscosity of the solution thereof tends to become higher, and thus the use of alkyl groups of unnecessarily long chain alkyl groups is not preferred from the point of handling. The above organomagnesium compounds are used in the form of a solution in hydrocarbon, and even if a slight amount of a complexing agent such as ether, ester or amine is contained or remains in the solution, it can be used without any problem.

Next, the compound [component (ii)] to be reacted with the organomagnesium compound (i) will be described. This compound is selected from amine, alcohol and siloxane compounds.

The amine compounds include, for example, aliphatic, alicyclic and aromatic amines, and examples thereof include methylamine, dimethylamine, trimethylamine, ethylamine, diethylamine, triethylamine, butylamine, dibutylamine, tributylamine, hexylamine, dihexylamine, trihexylamine, octylamine, dioctylamine, trioctylamine, aniline, N-methylaniline, N,N-dimethylaniline, toluidine, etc.

Examples of the alcohol compounds include ethyl alcohol, n-butyl alcohol, sec-butyl alcohol, tert-butyl alcohol, amyl alcohol, hexyl alcohol, 2-methylpentyl alcohol, 2-ethylbutyl alcohol, 2-ethylpentyl alcohol, 2-ethylhexyl alcohol, 2-ethyl-4-methylpentyl alcohol, 2-propylheptyl alcohol, 2-ethyl-5-methyloctyl alcohol, n-octyl alcohol, n-decyl alcohol, cyclohexanol, phenol, etc. Preferred are n-butyl alcohol, sec-butyl alcohol, 2-methylpentyl alcohol and 2-ethylhexyl alcohol.

The siloxane compounds will be described below. They include siloxane compounds having constitutive units represented by the following general formula (11):

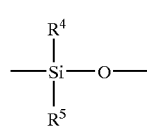

(11)

The substituents $R^4$ and $R^5$ are hydrogen or groups selected from the group consisting of hydrocarbon groups of 1–30 carbon atoms and substituted hydrocarbon groups of 1–40 carbon atoms, and examples of the hydrocarbon groups include a methyl group, ethyl group, n-propyl group, iso-propyl group, n-butyl group, isobutyl group, sec-butyl group, tert-butyl group, pentyl group, hexyl group, octyl group, decyl group, phenyl group, tolyl group, vinyl group, etc.

Examples of the substituted hydrocarbon groups include a trifluoropropyl group, etc.

These compounds can be used in the form of chain or cyclic compounds of dimers or higher polymers which comprise one or two or more different constitutive units.

Examples of the siloxane compounds include symmetric dihydrotetramethyldisiloxane, hexamethyldisiloxane, hexamethyltrisiloxane, pentamethyltrihydrotrisiloxane, cyclic methylhydrotetrasiloxane, cyclic methylhydropentasiloxane, cyclic dimethyltetrasiloxane, cyclic methyltrifluoropropyltetrasiloxane, cyclic methylphenyltetrasiloxane, cyclic diphenyltetrasiloxane, (terminal trimethylsilyl-capped) methylhydropolysiloxane, dimethylpolysiloxane, (terminal trimethylsilyl-capped) phenylhydropolysiloxane, methylphenylpolysiloxane, etc.

The reaction between the component (ii) and the component (i) can be carried out at a temperature between room temperature and 150° C. in an inert reaction medium, for example, an aliphatic hydrocarbon such as hexane, heptane or the like or an aromatic hydrocarbon such as benzene, toluene or the like. As for the sequence of the reaction, any of a method of adding the component (ii) to the component (i), a method of adding the component (i) to the component (ii), and a method of adding them simultaneously can be employed. The reaction ratio of the component (i) and the component (ii) is not particularly limited, but the range of molar ratio of the component (ii) to the total metal atoms in the organomagnesium component resulting from the reaction is 0.01–2, preferably 0.1–1.

In the present invention, the component [D] may be used either alone or in combination.

In the present invention, the component [D] is used as a scavenger. This component [D], even in a high concentration, hardly decreases the polymerization activity of the catalyst, and thus a high polymerization activity of the catalyst can be maintained in a wide range of scavenger concentration. Therefore, the polymerization activity of the catalyst for olefin polymerization containing the component [D] can be easily controlled.

The concentration of the component [D] in the use for polymerization is 0.001–10 mmols/liter, preferably 0.01–5 mmols/liter in total concentration when the sum of the mol numbers of the organometallic compounds is assumed to be the total mol number.

Next, a specific embodiment of carrying out the polymerization of olefin in the presence of the catalyst of the present invention will be described below. Using the catalyst for polymerization of olefins of the present invention, ethylene can be homopolymerized or copolymerized with at least one olefin, preferably selected from the group consisting of an α-olefin of 3–20 carbon atoms, a cyclic olefin of 3–20 carbon atoms, a compound represented by the formula $CH_2=CHR$ (where R is an aryl group of 6–20 carbon atoms) and a straight chain, branched chain or cyclic diene of 4–20 carbon atoms.

In the present invention, the α-olefin of 3–20 carbon atoms is selected from the group consisting of, for example, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; the cyclic olefin of 3–20 carbon atoms is selected from the group consisting of, for example, cyclopentene, cyclohexene, cycloheptene, norbornene, 5-methyl-2-norbornene, tetracyclododecene and 2-methyl-1.4,5,8-dimethano-1,2,3,4,4a,5,8,8a-octahydronaphthalene; the compound represented by the formula $CH_2=CHR$ (where R is an aryl group of 6–20 carbon atoms) is, for example, styrene, vinylcyclohexane, etc.; and the straight chain, branched chain or cyclic diene of 4–20 carbon atoms is selected from the group consisting of, for example, 1,3-butadiene, 1,4-pentadiene, 1,5-hexadiene, 1,4-hexadiene and cyclohexadiene.

By the copolymerization of ethylene and the above olefins (comonomers), the density or physical properties of the ethylene polymers can be controlled. The polymerization of olefins in the present invention can be performed by either a suspension polymerization method or gas phase polymerization method. In the suspension polymerization method, an inert hydrocarbon medium can be used as a medium for the suspension polymerization, and the olefin per se can also be used as the solvent.

Examples of the inert hydrocarbon media include aliphatic hydrocarbons such as propane, butane, isobutane, pentane, isopentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethyl chloride, chlorobenzene and dichloromethane; mixtures of these hydrocarbons; etc.

In the polymerization of ethylene using the catalyst for olefin polymerization of the present invention it is preferred that the amount of the solid catalyst component fed to the polymerization system for homopolymerizing or copolymerizing ethylene is controlled so that the amount of the solid catalyst component becomes, for example, 1 to 0.001% by weight based on the total weight of the polymer obtained per hour. The polymerization temperature is preferably not lower than 0° C., more preferably not lower than 50° C., further preferably not lower than 60° C. and not higher than 150° C., preferably not higher than 110° C., further preferably not higher than 100° C. Further, the polymerization temperature is, preferably 0° C.–150° C., more preferably 50° C.–110° C. and still more preferably 60° C.–100° C. The polymerization pressure is preferably between atmospheric pressure and 10 MPa, more preferably 0.2–5 MPa, further preferably 0.5–3 MPa. The polymerization reaction can be carried out by any of a batch method, semi-continuous method and continuous method. Moreover, the polymerization can be carried out in two or more stages differing in reaction conditions.

Furthermore, as disclosed, for example, in DE3127133.2, the molecular weight of the resulting olefin polymer can also be adjusted by allowing hydrogen to be present in the polymerization system or by changing the polymerization temperature. The catalyst for olefin polymerization of the present invention can contain other components useful for olefin polymerization in addition to the above-mentioned components.

The present invention will be further specifically described by way of the following examples and comparative examples.

EXAMPLE 1

(Preparation of the Component [A]):

One gram of Silica P-10 (manufactured by Fuji Silicia Co., Ltd. (Japan)) was calcinated at 400° C. for 5 hours in a nitrogen atmosphere to be dehydrated. The amount of hydroxyl group on the surface of the dehydrated silica was 1.3 mmol/g-$SiO_2$. One gram of this dehydrated silica was dispersed in 40 ml of hexane to obtain a slurry. To the resulting slurry was added 1.5 ml of a solution of triethylaluminum in hexane (concentration: 1 M), followed by stirring for 1 hour, whereby triethylaluminum and hydroxyl groups on the surface of the silica were reacted to obtain the component [A] wherein all of the hydroxyl groups on the surface have been treated with triethylaluminum. Then, the supernatant liquid in the resulting reaction mixture was removed by decantation, thereby removing unreacted triethylaluminum in the supernatant liquid. Thereafter, a suitable amount of hexane was added to obtain 50 ml of a hexane slurry of the triethylaluminum-treated silica.

(Preparation of Catalyst Supported on Silica):

1.14 Gram of bis(hydrogenated tallow alkyl)methylammonium-tris(pentafluorophenyl)(4-hydroxyphenyl) borate (hereinafter referred to as "borate") was added to 10 ml of toluene and dissolved therein to obtain a 0.1M solution of the borate in toluene.

To this solution of borate in toluene was added 1 ml of a 1M solution of diethylethoxyaluminum in toluene at room temperature and further toluene was added thereto so that the borate concentration in the toluene solution reached 50 mM. Thereafter, the solution was stirred at room temperature for 1 hour to obtain a reaction mixture containing borate.

1.2 Milliliter of this reaction mixture containing borate was added to 50 ml of the slurry of the component [A] obtained as above, followed by stirring for 1 hour to support the borate on the silica by physical adsorption. Thus, a slurry of silica supporting the borate was obtained.

To the resulting slurry was added 0.6 ml of a solution obtained by dissolving 10 mmols of [(N-t-butylamide)(tetramethyl-$\eta^5$-cyclopentadienyl) dimethylsilane]titanium-1,3-pentadiene (hereinafter referred to as "titanium complex") in 100 ml of Isopar E (trademark for a hydrocarbon mixture manufactured by Exxon Chemical Co., Ltd. (USA)), followed by stirring for 3 hours to react the titanium complex with the borate. Thus, a reaction mixture was obtained which contained silica and a supernatant liquid and in which a catalytically active species was formed on the silica.

(Preparation of Component [D]):

In a flask of 200 ml were charged 40 ml of hexane and an organomagnesium compound represented by $AlMg_6 (C_2H_5)$ 3 $(n-C_4H_9)_{12}$ in an amount of 37.8 mmols in terms of Mg+Al, and 40 ml of hexane containing 2.27 g (37.8 mmols) of methylhydropolysiloxane (viscosity at 25° C.: 20 centistokes) was added thereto at 25° C., followed by raising the temperature to 80° C. and carrying out the reaction for 3 hours with stirring to obtain the component [D].

(Copolymerization of Ethylene with 1-hexene):

800 Milliliters of hexane was charged in an autoclave of 1.8 liters in volume, and the above component [D] was added thereto in an amount of 0.2 mmol in terms of Mg+Al. In this autoclave was charged pressurized ethylene to raise the internal pressure of the autoclave to 1 MPa, and furthermore 15 ml of 1-hexene was charged in the autoclave. Then, the internal temperature of the autoclave was raised to 75° C., and the slurry of catalyst supported on silica obtained as above was added in such an amount that the weight of the catalyst was 20 mg to start the copolymerization of ethylene and 1-hexene. The copolymerization was carried out for 30 minutes while adding ethylene to the autoclave so that the internal pressure of the autoclave was maintained at 1 MPa. After completion of the copolymerization, the reaction mixture (a slurry of the copolymer) was extracted from the autoclave, and the catalyst was deactivated with methanol. Thereafter, the reaction mixture was filtered, washed and dried to obtain 120 g of dry powder of the copolymer. The inside of the autoclave was inspected to find no deposition of the polymer on the inner wall, etc. of the autoclave. The catalytic activity was 2507 kg-PE/g-Ti.

The resulting powder of the copolymer had an average particle diameter of 340 µm and a bulk density of 0.35 g/cm$^3$, and showed markedly excellent fluidity. Thus, it was recognized that the resulting powder of the copolymer had remarkably excellent particle properties.

COMPARATIVE EXAMPLE 1

(Copolymerization of Ethylene and 1-hexene):

Copolymerization was carried out in the same manner as in Example 1, except that 0.2 mmol of butylethylmagnesium was used in place of the component [D]. After completion of the copolymerization, the reaction mixture (a slurry of the copolymer) was extracted from the autoclave, and the catalyst was deactivated with methanol. Thereafter, the reaction mixture was filtered, washed and dried to obtain 50 g of dry powder of the copolymer. The inside of the autoclave was inspected, and no deposition of the polymer on the inner wall, etc. of the autoclave was found. The catalytic activity of the catalyst was 1044 kg-PE/g-Ti.

The resulting powder of the copolymer had an average particle diameter of 250 µm and a bulk density of 0.28 g/cm$^3$.

COMPARATIVE EXAMPLE 2

(Copolymerization of Ethylene and 1-hexene):

Copolymerization was carried out in the same manner as in Example 1, except that 0.2 mmol of triethylaluminum was used in place of the component [D]. After completion of the copolymerization, the reaction mixture (a slurry of the copolymer) was extracted from the autoclave, and the catalyst was deactivated with methanol. Thereafter, the reaction mixture was filtered, washed and dried to obtain 20 g of dry powder of the copolymer. The inside of the autoclave was inspected, and deposition of the polymer on the inner wall, etc. of the autoclave was found. The catalytic activity of the catalyst was 418 kg-PE/g-Ti.

The resulting powder of the copolymer had an average particle diameter of 200 µm and a bulk density of 0.21 g/cm$^3$.

COMPARATIVE EXAMPLE 3

(Copolymerization of Ethylene and 1-hexene):

Copolymerization was carried out in the same manner as in Example 1, except that 0.2 mmol of triisobutylaluminum was used in place of the component [D]. After completion of the copolymerization, the reaction mixture (a slurry of the copolymer) was extracted from the autoclave, and the catalyst was deactivated with methanol. Thereafter, the reaction mixture was filtered, washed and dried to obtain 95 g of a dry powder of the copolymer. The inside of the autoclave was inspected, and deposition of the polymer on the inner wall, etc. of the autoclave was found. The catalytic activity of the catalyst was 1984 kg-PE/g-Ti. The resulting powder of the copolymer had an average particle diameter of 320 µm and a bulk density of 0.26 g/cm$^3$.

EXAMPLE 2

(Preparation of the Component [D]):

In a flask of 200 ml were charged 40 ml of hexane and an organomagnesium compound represented by AlMg$_6$(C$_2$H$_5$)$_3$(n-C$_4$H$_9$)$_{12}$ in an amount of 37.8 mmols in terms of Mg+Al, and 40 ml of hexane containing 37.8 mmols of n-butyl alcohol was added, followed by raising the temperature to 80° C. and carrying out the reaction for 3 hours with stirring to obtain the component [D].

(Copolymerization of Ethylene and 1-hexene):

Copolymerization was carried out in the same manner as in Example 1, except that the component [D] was changed to the one obtained as above. After completion of the copolymerization, the reaction mixture (a slurry of the copolymer) was extracted from the autoclave, and the catalyst was deactivated with methanol. Thereafter, the reaction mixture was filtered, washed and dried to obtain 82 g of a dry powder of the copolymer. The inside of the autoclave was inspected, and no deposition of the polymer on the inner wall, etc. of the autoclave was found. The catalytic activity of the catalyst was 1713 kg-PE/g-Ti.

The resulting powder of the copolymer had an average particle diameter of 300 µm and a bulk density of 0.34 g/cm$^3$, and had a markedly excellent fluidity. Thus, it was recognized that the resulting powder of the copolymer showed markedly excellent particle properties.

EXAMPLE 3

(Preparation of Methylalumoxane-Supporting Silica)

Four grams of silica (manufactured by Fuji Silicia Co., Ltd. (Japan); pore volume: 1.10 cm$^3$/g, specific surface area: 318 m$^2$/g, bulk density: 0.38 g/cm$^3$, amount of hydroxyl group: 4.1 wt %) and 40 ml of toluene were charged into a glass flask of 300 ml, the inside of which was sufficiently replaced with nitrogen to make a slurry, and the slurry was cooled to −10° C. To this slurry was added dropwise 70 ml of a solution of methylalumoxane (manufactured by Albermar Co. (USA)) in toluene (Al concentration: 1 mol/l) over a period of 1 hour while keeping the temperature of the system at −10° C. Thereafter, the reaction was carried out at 0° C. for 1 hour, at room temperature for 1 hour, and at 110° C. for 3 hours. Generation of methane gas occurred during a series of the operations. Thereafter, the reaction product was cooled to 20° C. to obtain a slurry of silica on which methylalumoxane was supported and in which all of the hydroxyl groups on the surface of the silica were removed.

(Preparation of Catalyst Supported on Silica):

To the resulting slurry was added a solution of bis(n-butylcyclopentadienyl)zirconium dichloride in toluene (2.5 mmols/liter) in an amount of 0.24 mmol in terms of zirconium, and the reaction was carried out at 50° C. for 3 hours. Thus, a reaction mixture comprising silica on which catalytically active species was formed was obtained.

(Copolymerization of Ethylene and 1-hexene):

800 Milliliters of hexane was charged into an autoclave of 1.8 liters in volume, and the component [D] as used in Example 1 was added thereto in an amount of 0.2 mmol in terms of Mg$^+$Al. In this autoclave was charged pressurized ethylene to raise the internal pressure of the autoclave to 1 MPa, and furthermore 10 ml of 1-hexene was charged into the autoclave. Then, the internal temperature of the autoclave was raised to 75° C., and the slurry of the solid catalyst as obtained above was added in such an amount that the weight of the solid catalyst was 30 mg to start the copolymerization of ethylene and 1-hexene. The copolymerization was carried out for 30 minutes while adding ethylene to the autoclave so that the internal pressure of the autoclave was maintained at 1 MPa. After completion of the copolymerization, the reaction mixture (a slurry of the copolymer) was extracted from the autoclave, and the catalyst was deactivated with methanol. Thereafter, the reaction mixture was filtered, washed and dried to obtain 180 g of dry powder of the copolymer. The inside of the autoclave was inspected, and no deposition of the polymer on the inner wall, etc. of the autoclave was found. The catalytic activity of the catalyst was 1310 kg-PE/g-Zr.

The resulting powder of the copolymer had an average particle diameter of 470 μm and a bulk density of 0.32 g/cm$^3$, and showed markedly excellent fluidity. Thus, it was recognized that the resulting powder of the copolymer had markedly excellent particle properties.

EXAMPLE 4

(Preparation of Catalyst Supported on Montmorillonite):

70 Grams of commercially available granulated montmorillonite (BENCLAY SL having an average particle diameter of 16.2 μm manufactured by Mizusawa Chemical Co., Ltd.) was dispersed in 500 ml of ion-exchanged water in which 100 g of magnesium sulfate heptahydrate and 80 g of sulfuric acid were dissolved, and the dispersion was heated up to 100° C. in 2 hours and kept at that temperature for 2 hours. Then, it was cooled down to 50° C. in 1 hour. The resulting slurry was filtered under reduced pressure, and a recovered solid was dried at 110° C. overnight in a nitrogen atmosphere to obtain 60 g of chemically treated montmorillonite.

10 Grams of the above chemically treated montmorillonite was introduced, followed by adding toluene and a solution of triethylaluminum (5 mmols) in hexane and stirring at room temperature. After a lapse of 1 hour, washing with hexane was carried out to prepare 200 ml of a hexane slurry.

Then, to the slurry was added 65 ml of a toluene slurry of ethylenebis(indenyl)hafniumdimethyl (0.2 mmol) at room temperature, and reaction was carried out for 1 hour with stirring to obtain a reaction mixture comprising montmorillonite on which a catalytically active species was formed.

(Copolymerization of Ethylene and 1-hexene):

Polymerization reaction was carried out in the same manner as in Example 3, except that the polymerization time was 1 hour in place of 30 minutes, to obtain 40 g of a copolymer. The inside of the autoclave was inspected, and no deposition of the polymer on the inner wall, etc. of the autoclave was found. The catalytic activity of the catalyst was 600 kg-PE/g-Hf.

The resulting powder of the copolymer had an average particle diameter of 210 μm and a bulk density of 0.32 g/cm$^3$, and showed markedly excellent fluidity. Thus, it was recognized that the resulting powder of the copolymer had markedly excellent particle properties.

EXAMPLE 5

Preparation of catalyst and polymerization were carried out in the same manner as in Example 1, except that 0.3 mmol of N,N'-bis(2,6-diisopropylphenyl)-2,3-butanediiminenickel (II) chloride was used in place of [(N-t-butylamide)(tetramethyl-η$^5$-cyclopentadienyl)dimethylsilane]titanium-1,3-pentadiene, to obtain 17 g of a copolymer. The inside of the autoclave was inspected, and no deposition of the polymer on the inner wall, etc. of the autoclave was found. The catalytic activity of the catalyst was 122 kg-PE/g-Ni.

The resulting powder of the copolymer had an average particle diameter of 190 μm and a bulk density of 0.33 g/cm$^3$, and showed markedly excellent fluidity. Thus, it was recognized that the resulting powder of the copolymer had markedly excellent particle properties.

EXAMPLES 6–19

Preparation of catalyst and polymerization reaction were carried out in the same manner as in Example 1, except that the components [D] as shown in Table 1 were used, to obtain the results as shown in Table 1. No deposition of the polymer on the inner wall, etc. of the autoclave was found in any of the polymerizations.

TABLE 1

| | Component [D] | | Molar ratio of component (ii) to the molar amount of Mg + Al in component (i) | Results of polymerization | | |
|---|---|---|---|---|---|---|
| Example | Component (i) | Component (ii) | | Yield g | Activity kg-PE/ g-Ti | Average particle diameter μm | Bulk density g/cm$^3$ |
| 6 | AlMg$_{50}$(C$_2$H$_5$)$_3$(n-C$_4$H$_9$)$_{100}$ | Methylhydropolysiloxane | 1 | 100 | 2089 | 330 | 0.34 |
| 7 | AlMg$_9$(C$_2$H$_5$)$_3$(n-C$_4$H$_9$)$_{18}$ | Methylhydropolysiloxane | 1 | 110 | 2297 | 340 | 0.35 |
| 8 | Mg(C$_6$H$_{13}$)$_2$ | Methylhydropolysiloxane | 1 | 100 | 2089 | 330 | 0.33 |
| 9 | AlMg$_6$(C$_2$H$_5$)$_3$(n-C$_4$H$_9$)$_{12}$ | Methylhydropolysiloxane | 0.5 | 95 | 1984 | 330 | 0.32 |
| 10 | AlMg$_6$(C$_2$H$_5$)$_3$(n-C$_4$H$_9$)$_{12}$ | Methylhydropolysiloxane | 2 | 110 | 2297 | 340 | 0.34 |
| 11 | AlMg$_6$(C$_2$H$_5$)$_3$(n-C$_4$H$_9$)$_{12}$ | Dimethylpolysiloxane | 1 | 90 | 1880 | 320 | 0.33 |
| 12 | AlMg$_6$(C$_2$H$_5$)$_3$(n-C$_4$H$_9$)$_{12}$ | Octamethylcyclotetrasiloxane | 1 | 100 | 2089 | 330 | 0.34 |
| 13 | AlMg$_6$(C$_2$H$_5$)$_3$(n-C$_4$H$_9$)$_{12}$ | Phenylhydropolysiloxane | 0.8 | 95 | 1984 | 330 | 0.33 |
| 14 | AlMg$_4$(C$_2$H$_5$)$_3$(n-C$_6$H$_{13}$)$_4$ | Symmetrical tetramethyl-dihydroxydisiloxane | 1 | 110 | 2297 | 340 | 0.33 |
| 15 | Mg(n-C$_4$H$_9$)$_{1.5}$(n-C$_8$H$_{17}$)$_{0.5}$ | Cyclic methylhydrotetrasiloxane | 0.5 | 80 | 1671 | 310 | 0.31 |
| 16 | Mg(sec-C$_4$H$_9$)$_2$ | Cyclic ethoxymethyl-pentasiloxane | 1 | 100 | 2089 | 330 | 0.33 |
| 17 | AlMg$_6$(C$_2$H$_5$)$_3$(n-C$_4$H$_9$)$_{12}$ | 2-Ethylhexyl alcohol | 1 | 70 | 1462 | 300 | 0.32 |
| 18 | AlMg$_6$(C$_2$H$_5$)$_3$(n-C$_4$H$_9$)$_{12}$ | Dioctylamine | 1 | 80 | 1671 | 310 | 0.34 |
| 19 | AlMg$_6$(C$_2$H$_5$)$_3$(n-C$_4$H$_9$)$_{12}$ | Methylhydropolysiloxane + n-butanol | 0.5 + 0.5 | 85 | 1775 | 320 | 0.32 |

INDUSTRIAL APPLICABILITY

The catalysts for olefin polymerization according to the present invention can be applied to suspension polymerization (slurry polymerization) or gas phase polymerization of olefins. The present invention provides the catalysts for olefin polymerization comprising the scavenger that can maintain high polymerization activity of the catalyst in a wide range of scavenger concentration as well as the method for polymerizing olefins using the above catalyst, that produce polymer powder causing no phenomena such as deposition on the reactor and having markedly excellent particle properties.

We claim:

1. A catalyst for olefin polymerization, comprising:
   a solid catalyst component comprising:
   [A] a solid component having no hydroxyl group,
   [B] a compound of a transition metal selected from Groups 3–11 of the Periodic Table, and
   [C] a mixture of an activator compound (C-1) capable of reacting with the transition metal compound [B] to form a metal complex having catalytic activity and an organoaluminum compound (C-2); and
   [D] an organomagnesium compound soluble in a hydrocarbon solvent which is obtained by reacting (i) an organomagnesium compound represented by the general formula:

$$(Mt)_\alpha(Mg)_\beta(R^1)_a(R^2)_b$$

wherein Mt is a metal atom belonging to Groups 1–3 of the Periodic Table, $R^1$ and $R^2$ are hydrocarbon groups of 2–20 carbon atoms, and $\alpha$, $\beta$, a and b are numerals satisfying the following relationship: $0 \leq \alpha$, $0 < \beta$, $0 \leq a$, $0 \leq b$, $a+b>0$, and $r\alpha+2\beta=a+b$ (where r is a valence of Mt) with (ii) a compound selected from an amine compound, an alcohol compound and a siloxane compound.

2. A catalyst for olefin polymerization according to claim 1, wherein Mt is Al, B, Zn or Be.

3. A catalyst for olefin polymerization according to claim 1 or 2, wherein $\alpha$ and $\beta$ satisfy the relationship $\alpha>0$ and $0.5 \leq \beta/\alpha \leq 10$.

4. A catalyst for olefin polymerization according to claim 1 or 2, wherein $R^1$ is a primary alkyl group.

5. A catalyst for olefin polymerization according to claim 1 or 2, wherein the compound [B] of a transition metal selected from Groups 3–11 of the Periodic Table is a compound represented by the following formula (1):

$$L_j W_k M X_p X'_q \qquad (1)$$

wherein L denotes independently a η-bonding cyclic anion ligand selected from the group consisting of a cyclopentadienyl group, indenyl group, tetrahydroindenyl group, fluorenyl group, tetrahydrofluorenyl group and octahydrofluorenyl group, and the ligand may optionally have 1–8 substituents, and the substituents are those having 20 or less non-hydrogen atoms which are independently selected from the group consisting of hydrocarbon groups of 1–20 carbon atoms, halogen atoms, halogen-substituted hydrocarbon groups of 1–12 carbon atoms, aminohydrocarbyl groups of 1–12 carbon atoms, hydrocarbyloxy groups of 1–12 carbon atoms, dihydrocarbylamino groups of 1–12 carbon atoms, hydrocarbylphosphino groups of 1–12 carbon atoms, silyl groups, aminosilyl groups, hydrocarbyloxysily groups of 1–12 carbon atoms, and halosilyl groups;

M denotes a transition metal having a formal oxidation number of +2, +3 or +4 which is selected from the group consisting of the transition metals belonging to Group 4 of the Periodic Table and is $\eta^5$-bonded to at least one ligand L;

W is a divalent substituent having 50 or less non-hydrogen atoms and bonds monovalently to L and M respectively, thereby to form a metallo-cycle together with L and M;

X denotes an anionic σ-bonding ligand having 60 or less non-hydrogen atoms which is selected independently from the group consisting of monovalent anionic σ-bonding ligands, divalent anionic σ-bonding ligands bonding divalently to M and divalent anionic σ-bonding ligands bonding monovalently to L and M respectively;

X' denotes independently a neutral Lewis base coordination compound having 40 or less non-hydrogen atoms;

j is 1 or 2, with a proviso that in the case of j being 2, the two ligands L may optionally bond to each other through a divalent group having 20 or less non-hydrogen atoms, and the divalent group is selected from the group consisting of hydrocarbadiyl groups of 1–20 carbon atoms, halohydrocarbadjyl groups of 1–12 carbon atoms, hydrocarbyleneoxy groups of 1–12 carbon atoms, hydrocarbyleneamino groups of 1–12 carbon atoms, silanediyl groups, halosilanediyl groups, and silyleneamino groups;

k is 0 or 1, and p is 0, 1 or 2, with a proviso that in the case of X being a monovalent anionic σ-bonding ligand or a divalent anionic σ-bonding ligand bonding to L and M, p is an integer which is smaller by at least 1 than the formal oxidation number of M, and in the case of X being a divalent anionic σ-bonding ligand bonding only to M, p is an integer which is smaller by at least (j+1) than the formal oxidation number of N, and q is 0, 1 or 2.

6. A catalyst for olefin polymerization according to claim 1 or 2, wherein the activator compound (C-1) capable of reacting with the transition metal compound [B] to form a metal complex having catalytic activity is a compound represented by the following formula (2):

$$[L-H]^{d+}[M_m Q_p]^{d-} \qquad (2)$$

wherein $[L-H]^{d+}$ denotes a proton donating Brønsted acid, L denotes a neutral Lewis base, and d is an integer of 1–7; $[M_m Q_p]^{d-}$ denotes a compatible non-coordination anion, M denotes a metal or metalloid belonging to Groups 5–15 of the Periodic Table, Q is selected independently from the group consisting of hydrides, halides, dihydrocarbylamide groups of 2–20 carbon atoms, hydrocarbyloxy groups of 1–30 carbon atoms, hydrocarbon groups of 1–30 carbon atoms and substituted hydrocarbon groups of 1–40 carbon atoms, the number of Q, which is a halide, is 1 or less, m is an integer of 1–7, p is an integer of 2–14, d is as defined above, and p−m =d).

7. A method for production of polyolefins, comprising polymerizing or copolymerizing olefins in the presence of the catalyst for olefin polymerization according to claim 1 or 2.

* * * * *